April 30, 1963   A. L. NILSSON   3,087,716
SPRING SUSPENSION FOR VEHICLES
Filed Dec. 26, 1961
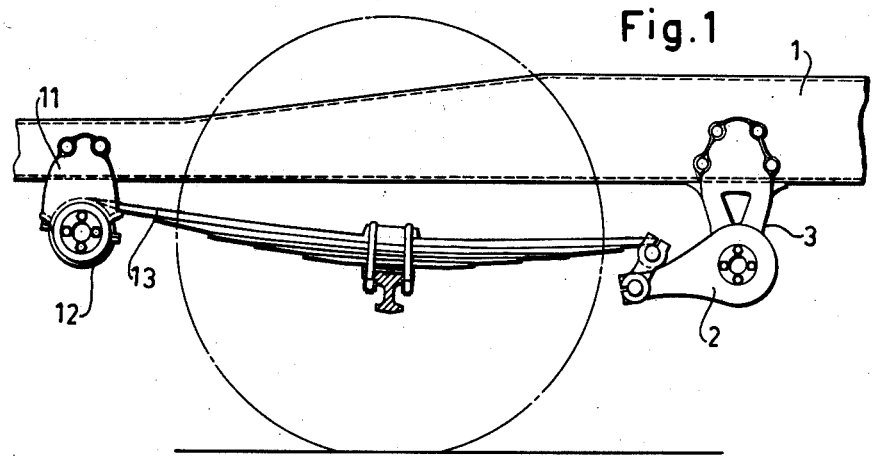
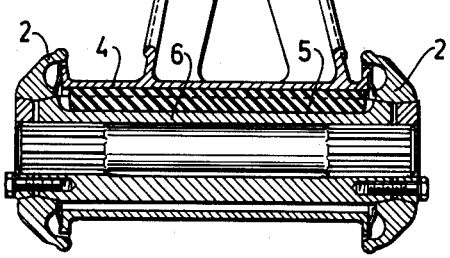
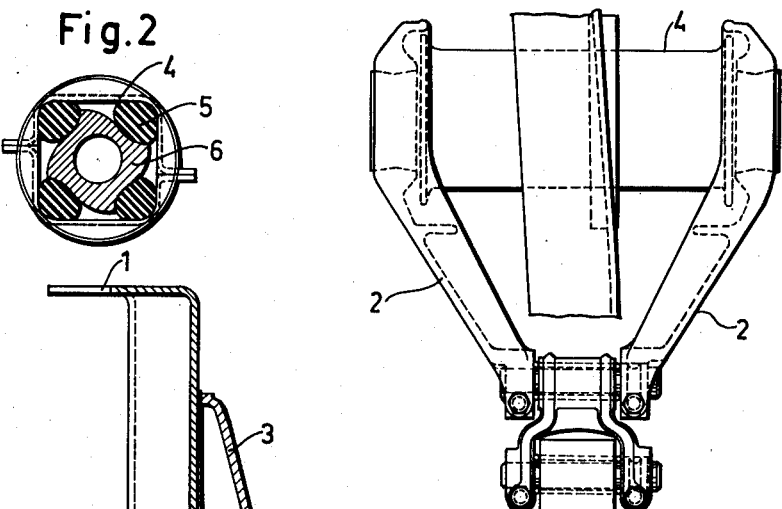

April 30, 1963 A. L. NILSSON 3,087,716
SPRING SUSPENSION FOR VEHICLES
Filed Dec. 26, 1961 2 Sheets-Sheet 2
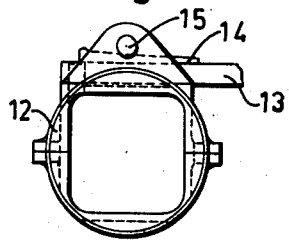
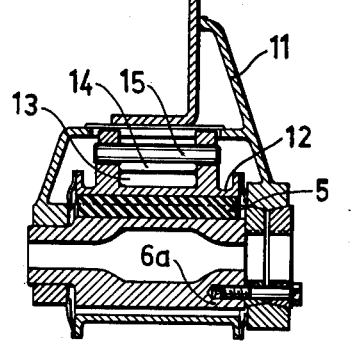
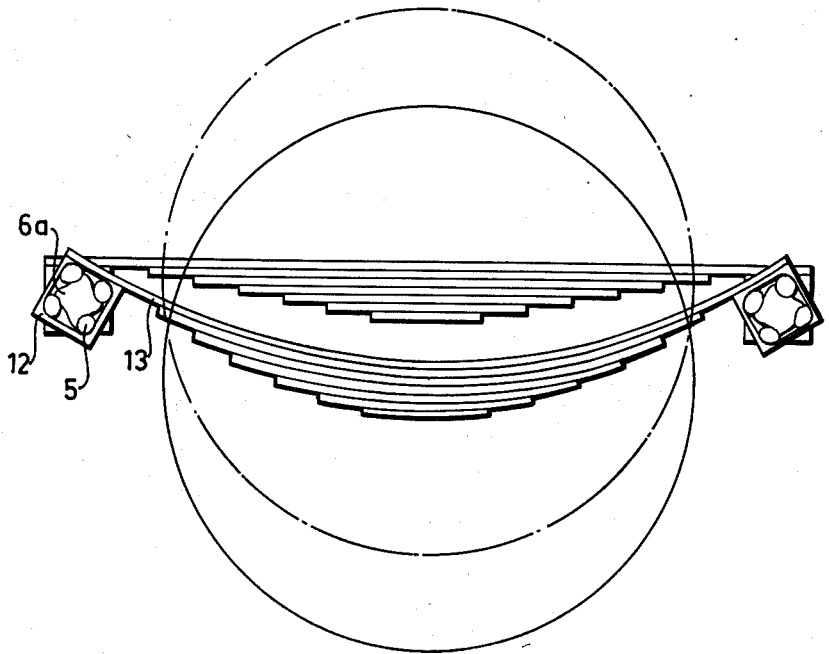

United States Patent Office 3,087,716
Patented Apr. 30, 1963

3,087,716
SPRING SUSPENSION FOR VEHICLES
August Leander Nilsson, Rundelsgatan 3,
Sodertalje, Sweden
Filed Dec. 26, 1961, Ser. No. 162,067
3 Claims. (Cl. 267—21)

The present invention relates to a spring suspension for vehicles comprising a leaf spring the ends of which are connected to the vehicle frame or the like, and the suspension according to the invention is substantially characterized in that at least one end of the leaf spring is connected to the vehicle frame by means of a torsion spring of the type which comprises a core element of polygonal cross-section which is surrounded by a sleeve element of corresponding cross-section, roller-shaped members of rubber or similar material being provided between said core element and said sleeve element which roller-shaped members are deformed upon relative rotational movement between the two elements, and in that said leaf spring end is rigidly secured to one of said elements, preferably to the sleeve element, in such a manner that it is tangential to a cylinder surface co-axial with the axis of the torsion spring.

The invention will be described more in detail with reference to the attached drawing illustrating two embodiments of the invention. FIG. 1 is a side elevation of the spring suspension according to the invention while FIGS. 2–6 illustrate on a larger scale certain details of said spring suspension. FIG. 7 shows diagrammatically another embodiment of the invention.

In the figures 1 denotes the vehicle frame and 13 a leaf spring which at its central portion is connected to the axle of a diagrammatically indicated wheel. The rear end of leaf spring 13 is connected by means of a link to the lever 2 of a torsion spring of known type which is shown in cross-section in FIG. 2. The lever 2 is non-rotationally connected to a core element of substantially square cross-section bearing reference numeral 6 in FIG. 2. The core element 6 is surrounded by a sleeve element 4 which is likewise of substantially square cross-section. Between the sleeve element 4 and the core element 6 are inserted roller-shaped members 5 of rubber which are deformed upon relative rotational movement between the two elements. The sleeve element 4 is supported by a bracket 3 secured to the vehicle frame 1.

FIG. 3 is a plan view of the arrangement at the end of the leaf spring 13 and FIG. 4 is a longitudinal section through the torsion spring comprised in said arrangement.

At its front end the leaf spring 13 is rigidly secured to the sleeve element of a torsion spring of the same type as that shown in FIG. 2. According to FIGS. 5 and 6 the sleeve element, in this instance bearing reference numeral 12, is provided with two brackets for a pin 15. A wedge 14 is driven in between the pin 15 and the end of the leaf spring 13 which is inserted under the pin. The wedge 14 keeps the leaf spring end pressed against the outside of the sleeve element. The core element 6a of the torsion spring is supported by a bracket 11 secured to the vehicle frame.

In the embodiment according to FIG. 7 both ends of the leaf spring 13 are rigidly connected to the sleeve elements 12 of torsion springs in the same manner as shown in FIGS. 5 and 6. The spring suspension is such that the leaf spring 13 only at heavy shocks upon the wheel reaches a substantially straight horizontal position indicated in FIG. 7.

In both embodiments the torsion springs are strained by the load of the vehicle. The torsion springs will then exert bending forces upon the leaf spring 13 which under the influence of the load tends to be straight. The momentum at the end (ends) of the leaf spring 13 tends to counteract this straightening and increases with the load. In practice this will have the same effect as a shortening of the effective length of the leaf spring whereby the leaf spring will be progressively acting. This fulfills the requirements for spring suspensions for vehicles as a relatively soft elasticity is desired at low vehicle load and a stiffer spring at heavier loads.

The characteristic of a progressively acting spring starts substantially tangentially relative to the co-ordinate axis corresponding to a stretching of the spring. This involves that the deflection of such a spring, upon an increase of the load from zero to the weight of the vehicle, will be relatively great. If, according to the present invention, the torsion springs are set under a pre-tension which, already at unloaded leaf spring, tends to bend the leaf spring downwards, there is attained a displacement of the spring characteristic so that the spring suspension as a whole obtains very favourable properties with respect to deflection and progressivity.

A torsion spring of the type described has an operation range of about 45°. By pre-tensioning the torsion spring, as proposed by the present invention, substantially the whole of said range may be utilized. On the other hand, a spring suspension must be such that the wheel can move vertically over a certain distance relatively to the frame during driving and therefore leaf springs are generally made such that they are relatively strongly curved in unloaded condition. Owing to the fact that in the present case the leaf spring is pre-tensioned in a negative direction its pitch is increased and therefore the leaf spring may have a smaller pitch in unstrained condition than leaf springs of normal spring suspensions. This renders it possible to use relatively thick spring leaves and to decrease the number of leaves.

It is evident that in the embodiment according to FIG. 7 the leaf spring will be subjected to longitudinally acting thrust forces during operation if the distance between the axes of the torsion springs be definitely fixed. However, the resiliency of the rubber elements of the torsion springs allow for a small horizontal movement of the sleeve elements, which is sufficient for compensating the theoretical variations of the horizontal length of the system upon vertical movements of the wheel. Preferably the length of the leaf spring is chosen such that the theoretical length of the system is the same when the leaf spring is loaded to substantially straight shape as in unstrained condition of the leaf spring. If desired, one of the torsion springs, preferably the rear spring, may be mounted on link means swingable about a horizontal axis perpendicular to the longitudinal direction of the vehicle and allowing the spring to move in said direction, the core element of the spring being rigidly secured to the link ends.

What is claimed is:

1. A spring suspension for vehicles comprising a leaf spring pivotally connected at its ends to the vehicle frame or the like, at least one of the leaf spring ends being connected to the vehicle frame by means of a torsion spring consisting of a core element of polygonal cross-section surrounded by a sleeve element of corresponding cross-section, roller-shaped members of rubber being provided between the core element, and the sleeve element which members are deformed upon relative pivotal movement between the two elements, said one leaf spring end being rigidly connected to one of said torsion spring elements tangentially to a cylindrical surface co-axial to the torsion spring axis.

2. A spring suspension according to claim 1, in which said one leaf spring end is secured to the outside of the sleeve element by means of a wedge lock.

3. Spring suspension according to claim 1 in which said torsion spring is pre-tensioned.

References Cited in the file of this patent
UNITED STATES PATENTS

| | | |
|---|---|---|
| 1,825,352 | Jansson | Sept. 29, 1931 |
| 2,698,172 | Zoltok | Dec. 28, 1954 |
| 2,917,304 | Nilsson | Dec. 15, 1959 |